United States Patent [19]
Sakamoto

[11] Patent Number: 4,890,880
[45] Date of Patent: Jan. 2, 1990

[54] SUNSHADE ASSEMBLY OF MOTOR VEHICLE

[75] Inventor: Manabu Sakamoto, Ayase, Japan

[73] Assignee: Ikeda Bussan Co., Ltd., Ayase, Japan

[21] Appl. No.: 201,790

[22] Filed: Jun. 2, 1988

[30] Foreign Application Priority Data

Jun. 29, 1987 [JP] Japan .................... 62-99910[U]

[51] Int. Cl.[4] .............................. B60R 13/02
[52] U.S. Cl. ..................... 296/214; 296/216
[58] Field of Search ............ 296/214, 211, 215, 216, 296/218, 221, 222; 49/63

[56] References Cited

U.S. PATENT DOCUMENTS

| | | | |
|---|---|---|---|
| 4,650,244 | 3/1987 | Boots | 296/214 |
| 4,671,564 | 6/1987 | Sumida et al. | 296/214 |
| 4,717,200 | 1/1988 | Krüger | 296/214 |
| 4,722,565 | 2/1988 | Kanou et al. | 296/214 |

FOREIGN PATENT DOCUMENTS 282120 12/1986 Japan .................... 296/214

*Primary Examiner*—Robert R. Song
*Attorney, Agent, or Firm*—Foley & Lardner, Schwartz, Jeffery, Schwaab, Mack, Blumenthal & Evans

[57] ABSTRACT

A sunshade assembly incorporated with a sun roof construction is disclosed, which comprises a shading panel slidable forward and rearward to close and open an opening of a ceiling panel placed below a roof of a vehicle, a holding structure arranged to stably hold the shading panel relative to the ceiling panel when the shading panel assumes a position to close the opening, and a slide shoe connected to the shading panel and having a contact portion which is in contact with an upper surface of the ceiling panel. The slide shoe is so sized and constructed as to prevent the shading panel from abutting against the ceiling panel. The contact portion of the slide shoe is coated with a plastic to reduce a contact resistance between the contact portion and the upper surface of the ceiling panel.

16 Claims, 2 Drawing Sheets

SUNSHADE ASSEMBLY OF MOTOR VEHICLE

BACKGROUND OF THE INVENTION

1. Field of the Invention

The present invention relates in general to a sunshade assembly which, as occasion demands, covers a sun roof opening formed in a roof of a motor vehicle. More specifically, the present invention relates to a sunshade assembly which is associated with a sun roof construction of the type which uses a transparent panel, such as glass panel, plastic panel or the like, as a sun roof lid.

2. Description of the Prior Art

In order to clarify the task of the present invention, one conventional sunshade assembly of the above-mentioned type will be described in the following with reference to FIG. 5 of the accompanying drawings.

As is seen from the drawing, the sunshade assembly is associated with a sun roof construction installed on a roof 3 of a motor vehicle. The sun roof construction uses a rectangular glass panel 4 as a sun roof lid, which is tiltably mounted on the roof 3 to close and open a rectangular sun roof opening 5 formed in the roof 3. The sunshade assembly is installed below the sun roof structure.

The sunshade assembly uses a rectangular shading panel 1 which includes a base plate 1a and a decorative layer 1b bonded to a lower surface of the base plate 1a. The shading panel 1 is slidably supported by a ceiling panel 2 of a passenger room. The ceiling panel 2 is formed with a rectangular opening 2b at a portion facing the sun roof opening 5. Designated by numeral 2a is one of beads 2a which are formed on the ceiling panel 2 to increase the mechanical strength of the same. A protector strip 6 extends around the peripheral edge of the ceiling panel 2 by which the opening 2b is defined. Guide brackets (not shown) extend upward from side portions of the opening 2b to slidably hold side edges of the shading panel 1. With this, the shading panel 1 is slidable forward to close the opening 2b and rearward to open the same.

However, due to its inherency in construction, the sunshade assembly has the following drawbacks.

When, as is seen from FIG. 5, the shading panel 1 is moved into a container space defined between the roof 3 and the ceiling panel 2, the shading panel 1 is inclined downward due to its own weight. This causes the rear portion of the shading panel 1 to abut against the ceiling panel 2. The abutment becomes much severe when the bead 2a is located at the container space, as shown. This abutment however tends to scrape off the decorative layer 1b of the shading panel 1 during opening and closing movements of the shading panel 1. Furthermore, such abutment increases the contact resistance between the shading panel 1 and the ceiling panel 2 thereby increasing the force required for moving the shading panel 1.

SUMMARY OF THE INVENTION

It is therefore an object of the present invention to provide a sunshade assembly which is free of the above-mentioned drawbacks.

According to the present invention, there is provided, in a motor vehicle having a roof equipped with a sun roof construction and a ceiling panel placed below the roof, an improved sunshade assembly. The sunshade assembly comprises means defining in the ceiling panel an opening which faces an opening of the sun roof construction; a shading panel slidable between a first position wherein the shading panel closes the opening of the ceiling panel and a second position wherein the shading panel opens the opening of the ceiling panel and is contained in a container space defined between the roof and the ceiling panel; holding means for stably holding the shading panel relative to the ceiling panel when the shading panel assumes the first position; and a slide shoe connected to a given portion of the shading panel to move therewith, the slide shoe having a contact portion which slidably contacts the ceiling panel to suppress the shading panel from contacting the ceiling panel when the shading panel assumes the second position.

BRIEF DESCRIPTION OF THE DRAWINGS

Other objects and advantages of the present invention will be clarified from the following description when taken in conjunction with the accompanying drawings, in which.

DETAILED DESCRIPTION OF THE INVENTION

Referring to FIGS. 1 to 4 of the accompanying drawings, there is shown a sunshade assembly according to the present invention, which is incorporated with a known sun roof construction of a motor vehicle 10.

Figure 3:
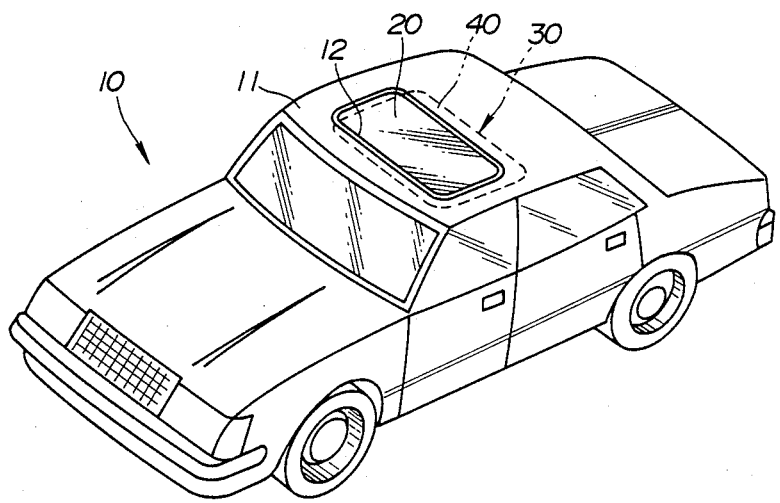
FIG. 3 is a perspective view of a passenger motor vehicle to which the present invention is practically applied.

As is seen from FIG. 3, the sun roof construction comprises a rectangular opening 12 formed in a roof 11 of the motor vehicle 10, and a rectangular sun roof lid 20 tiltably mounted on the roof 11 by means of a known tilting mechanism to close and open the opening 12. The tilting mechanism is arranged to pivot the sun roof lid 20 in a manner to raise up the rear edge portion of the lid 20 considerably from the opening 12. The lid 20 is constructed of a transparent material, such as glass, plastic or the like. Designated by numeral 11a is a weather strip which extends around the peripheral edge of the roof 11 by which the opening 12 is defined.

Below the sun roof construction, there is arranged a sunshade assembly 30 according to the present invention.

Figure 2:
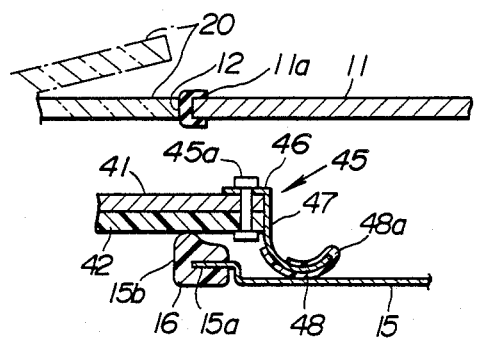
FIG. 2 is an enlarged sectional view taken along the line II—II of FIG. 1, showing in addition some parts incorporated with the sunshade assembly.

As is shown in FIG. 2, the sunshade assembly 30 generally comprises a rectangular opening 15b which is formed in a ceiling panel 15 at a portion facing the opening 12 of the roof 11 and a rectangular shading panel 40 which is slidably supported by the ceiling panel to close and open the opening 15b in a manner which will be described in detail in the following.

As is seen from FIG. 2, the ceiling panel 15 is equipped with a protector strip 16 which extends around a peripheral edge 15a of the panel 15 by which the opening 15b is defined. For tightly holding the protector strip 16, the peripheral edge 15a is somewhat raised. As shown, the protector strip 16 is formed with a semicylindrical upper portion (no numeral).

The shading panel 40 comprises a base plate 41 (see FIG. 2) and a decorative layer 42 which is bonded to a lower surface of the base plate 41. As is seen from FIG. 1, the shading panel 40 is provided at each side thereof with front and rear guided devices 43 and 43. Each guided device 43 comprises a generally U-shaped bracket 43a (see FIG. 4) bolted to the side of the panel 40, two generally U-shaped sliders 43c and 43c and two flexible wires 43b and 43b by which the sliders 43c and 43c are connected to the bracket 43a. Thus, each slider 43c moves freely relative to the shading panel 40.

Figure 4:
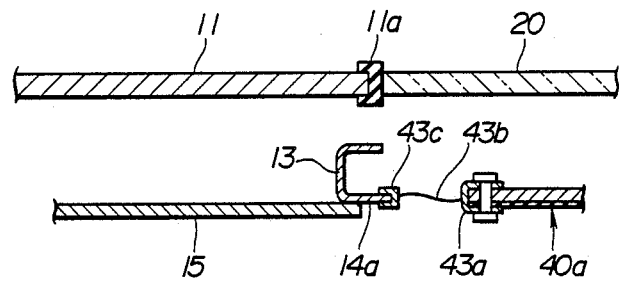
FIG. 4 is a sectional view taken along the line IV—IV of FIG. 1, showing in addition some parts incorporated with the sunshade assembly.
Figure 5:
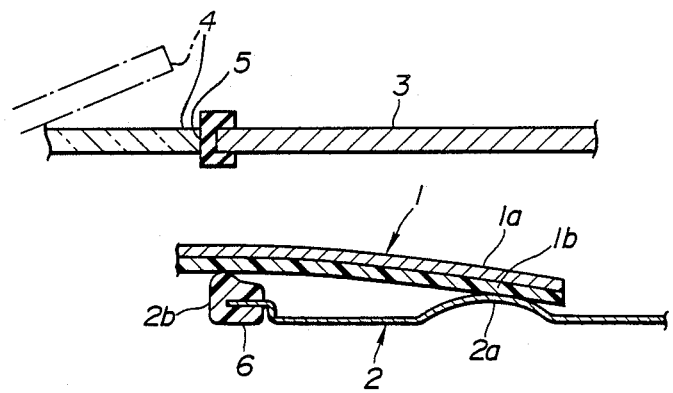
FIG. 5 is a view similar to FIG. 2, but showing a conventional sunshade assembly.

As will be understood from FIG. 4, the four sliders 43c, 43c, 43c and 43c of the front and rear guided devices 43 and 43 mounted to each side of the shading panel 40 are slidably engaged with a lower rail 14a of a channel-like guide member 13 which extends along the longitudinal axis of an associated motor vehicle and secured to the ceiling panel 15 beside the opening 15b. With this arrangement, it will be appreciated that the shading panel 40 is movable forward to a position to close the opening 15b and rearward to open the same.

In accordance with the present invention, the following measure is employed for solving the above-mentioned drawbacks.

Figure 1:
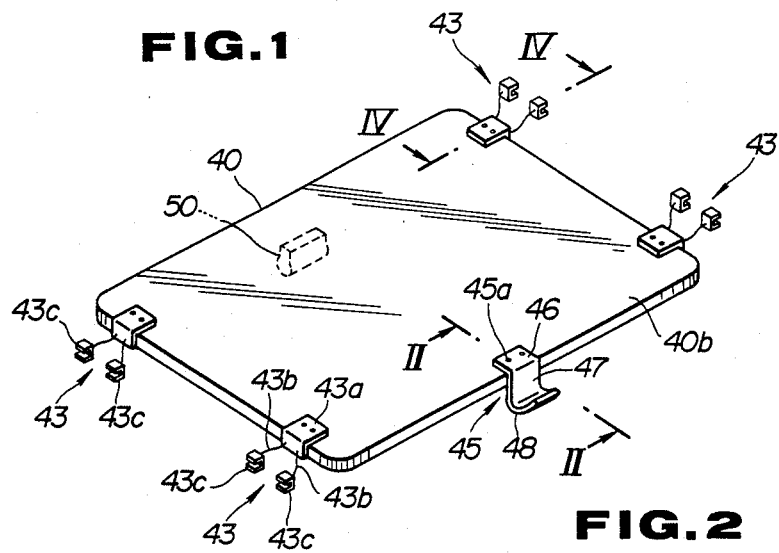
FIG. 1 is a perspective view of a shading panel used in a sunshade assembly according to the present invention.

As is seen from FIGS. 1 and 2, the shading panel 40 is provided at its rear middle portion with a slide shoe 45. The slide shoe 45 comprises a base portion 46 secured by bolts 45a to an upper surface of the shading panel 40, a shank portion 47 extending downward from the base portion and projecting beyond a lower surface of the panel 40 and a curled portion 48 extending from the shank portion 47. The curled portion 48 is coated with a plastic 48a, such as fluorocarbon resin or the like. As is seen from FIG. 2, upon assembly, the plastic-coated curled portion 48 is in contact with the upper surface of the ceiling panel 15. The slide shoe 45 is so sized as to keep the rear portion of the shading panel 40 away from the ceiling panel 15. Designated by numeral 50 is a knob which is fixed to a front portion of the shading panel 40.

In the following, operation of the shading assembly 30 of the invention will be described.

For ease of understanding, the description will be commenced with respect to a full-closed condition of the shading assembly 30. Under this condition, the shading panel 40 is placed above the opening 15b to close the same having the slide shoe 45 contacting with the ceiling panel 15 as shown in FIG. 2. In this condition, the light passing through the sun roof lid 20 is shaded.

When the shading panel 40 is pulled backward with the knob 50, the same is moved into the container space between the roof 11 and the ceiling panel 15 sliding the slide shoe 45 on and along the upper surface of the ceiling panel 15. With this movement, the opening 15b is fully opened thereby permitting the light from the sun roof lid 20 to find its way into the passenger room.

It is to be noted that due to provision of the slide shoe 45, the movement of the shading panel 40 into and from the container space does not induce the undesirable abutment of the panel 40 against the ceiling panel 15. Thus, the fragile decorative layer 42 of the shading panel 40 is protected.

Furthermore, since the slide shoe 45 is coated with the plastic 48a, the contact resistance between the shoe 45 and the ceiling panel 15 is reduced thereby smoothing the sliding movement of the shading panel 40. If desired, a roller (not shown) may be mounted to the slide shoe 45 to achieve much more smoothing the movement of the shading panel 40.

Although the above-description is directed to the example wherein the shading assembly 30 is associated with the tilt-up type sun roof construction, the shading assembly 30 of the invention may be incorporated with a slide type sun roof construction wherein the sun roof lid is slidable forward and rearward relative to roof 11.

What is claimed is:

1. In a motor vehicle having a roof equipped with a sun roof construction and a ceiling panel having an upper surface placed below the roof,
   a sunshade assembly comprising:
   means defining in said ceiling panel an opening which faces an opening of said sun roof construction;
   a shading panel slidable between a first position wherein the shading panel closes said opening of the ceiling panel and a second position wherein the shading panel opens the opening of the ceiling panel and is contained in a container space defined between said roof and said ceiling panel;
   holding means for holding said shading panel relative to said ceiling panel when said shading panel assumes said first position; and
   a slide shoe connected to a given portion in the vicinity of the rear edge of said shading panel to move therewith, said slide shoe having a contact portion which slidably contacts the upper surface of said ceiling panel to suppress said shading panel from contacting said ceiling panel when said shading panel assumes said second position.

2. A sunshade assembly as claimed in claim 1, in which said contact portion of said slide shoe is coated with a plastic.

3. A sunshade assembly as claimed in claim 2, in which said contact portion of said slide shoe is curled.

4. A sunshade assembly as claimed in claim 3, in which said plastic comprises a fluorocarbon resin.

5. A sunshade assembly as claimed in claim 3, in which said shading panel comprises a base plate and a decorative layer bonded to a lower surface of said base plate.

6. A sunshade assembly as claimed in claim 5, in which a peripheral portion of said ceiling panel by which said opening of the ceiling panel is defined is equipped with a protection strip.

7. A sunshade assembly as claimed in claim 6, in which said given portion of said shading panel is a rear middle portion of the same which is placed farmost from the opening of the ceiling panel when said shading panel assumes said second position.

8. A sunshade assembly as claimed in claim 1, in which said holding means comprises:
   front and rear guided devices fixed to each side of said shading panel; and
   two elongate guide members secured to said ceiling panel in a manner to place therebetween the opening of said ceiling panel,
   wherein said front and rear guided devices of each side of said shading panel are slidably engaged with one of said elongate guide members.

9. A sunshade assembly as claimed in claim 8, in which each of said front and rear guided devices comprises:
   a bracket secured to the side of the shading panel;

two sliders each having an engaging portion which is slidably engaged with one of said elongate guide members; and two flexible wires each connecting one of the sliders to said bracket.

10. A sunshade assembly as claimed in claim 9, in which said elongate guide member is of a channel-like member which extends along a longitudinal axis of the motor vehicle.

11. In a motor vehicle having a roof equipped with a sun roof construction and a ceiling panel having an upper surface placed below said roof, a sunshade assembly comprising:

means defining in said ceiling panel an opening which faces a sun roof opening of said sun roof construction;

a shading panel slidable on said ceiling panel to selectively open and close said opening of the ceiling panel, said shading panel being received by a container space defined between said roof and said ceiling panel when opening said opening of the ceiling panel;

two elongate guide members secured to said ceiling panel in a manner to place therebetween said opening of the ceiling panel;

front and rear guided devices connected through respective wires to each side of said shading panel and slidably engaged with one of said elongate guide members thereby to guide the opening and closing movement of said shading panel to relative to the opening of said ceiling panel; and a slide shoe connected to a rear edge of said shading panel to move therewith, said slide shoe having a contact portion which slidably contacts the upper surface of said ceiling panel to prevent the shading panel from contacting said ceiling panel.

12. A sunshade assembly as claimed in claim 10, wherein said guided devices are slidably engaged with a lower rail of said channel-like member.

13. A sunshade assembly as claimed in claim 11, in which said contact portion of said slide shoe is coated with a plastic.

14. A sunshade assembly as claimed in claim 13, in which said contact portion of said slide shoe is curled.

15. A sunshade assembly as claimed in claim 13, in which said plastic comprises a fluorocarbon resin.

16. A sunshade assembly as claimed in claim 11, in which said given portion of said shading panel is a rear middle portion of the same which is placed farmost from the opening of the ceiling panel when said shading panel assumes said second position.

* * * * *